US 6,728,314 B2

(12) United States Patent
Kan et al.

(10) Patent No.: US 6,728,314 B2
(45) Date of Patent: Apr. 27, 2004

(54) METHOD OF USING MPEG-7 STANDARD IN OBJECT SEGMENTATION

(75) Inventors: Ming-Cheng Kan, Chiai (TW); Chung J. Kuo, Chiai (TW)

(73) Assignee: National Chung Cheng University, Chia-Yi (TW)

( * ) Notice: Subject to any disclaimer, the term of this patent is extended or adjusted under 35 U.S.C. 154(b) by 356 days.

(21) Appl. No.: 09/989,541

(22) Filed: Nov. 21, 2001

(65) Prior Publication Data

US 2003/0035479 A1 Feb. 20, 2003

(30) Foreign Application Priority Data

Aug. 14, 2001 (TW) ........................................ 90119861 A

(51) Int. Cl.⁷ ................................................ H04B 1/66
(52) U.S. Cl. ............................ 375/240.12; 375/240.08; 375/240.26; 375/240.11; 382/173; 382/181; 382/199; 382/164; 382/165
(58) Field of Search ........................ 375/240.12, 240.08, 375/240.26, 240.11, 240.21, 240.25, 240.24; 382/173, 181, 199, 166, 164, 165

(56) References Cited

U.S. PATENT DOCUMENTS

| 6,208,693 | B1 | * | 3/2001 | Chen et al. ............ 375/240.24 |
| 6,307,964 | B1 | * | 10/2001 | Lin et al. ..................... 382/203 |
| 6,400,831 | B2 | * | 6/2002 | Lee et al. .................... 382/103 |
| 2002/0176625 | A1 | * | 11/2002 | Porikli et al. ................ 382/173 |
| 2003/0081836 | A1 | * | 5/2003 | Averbuch et al. ........... 382/199 |

* cited by examiner

Primary Examiner—Shawn S. An
(74) Attorney, Agent, or Firm—Intellectual Property Solutions, Incorporated

(57) ABSTRACT

The invention relates to a method of using MPEG-7 in object segmentation to extract a desired moving or still image object. The method includes extracting the feature of an existing video object Plane (VOP) by MPEG-7 technique and storing it in an MPEG-7 database, segmenting an input image into a plurality of objects by using the watershed process, comparing each of the plurality of objects to the stored object descriptor feature, and extracting the shape and position of the most similar object in the input image.

15 Claims, 8 Drawing Sheets

METHOD OF USING MPEG-7 STANDARD IN OBJECT SEGMENTATION

BACKGROUND OF THE INVENTION

1. Field of the Invention

The invention relates to a method of using MPEG standard in object segmentation, particularly, to a method of using MPEG-7 in object segmentation, which uses both human vision model and the jigsaw principle to recognize and recover the object.

2. Description of the Related Art

Currently, video object segmentation methods are splitted into automatic and semiautomatic ones. The automatic schemes segment an object based on the object's moving information while the semiautomatic one segments an object based on user-defined segmentation. Automatic mode cannot process a still object and semiautomatic mode is inconvenient. The MPEG-4 technique of video object segmentation is described as follows.

In MPEG-4, before coding, a motion estimation, an object segmentation, and a shape coding are applied to each object in a video or an image. As mentioned, video object segmentation is regarded as one of the key advantages of MPEG-4 technique.

In MPEG-4, the video content data can be segmented into a plurality of Video Object Planes (VOPs) based on requirements and the video content. The VOPs can be separately coded (compressed), stored and transferred. Also, the VOPs can be recomposed, deleted and replaced using the MPEG-4 standard system based on the application needs. Because a VOP is a basic unit of interaction, the success of applying MPEG-4 to various types of interactive multimedia is restricted in that the VOP can be effectively separated from video signal.

In the MPEG-4 video model, a frame can be defined by multiple video objects and a very high interaction with a user is enabled for developing in more applications. The user can access the objects freely as needed to form the desired frame. In MPEG-4 video, an image is regarded as the combination of video objects by the VOPs. However, there is no standard format for a video object in MPEG-4 other than a presentation model used to represent the video object. This is shown in FIG. 1 to be clearly seen in the concept of VOP. FIG. 2 is the structure of a VOP encoder and a VOP decoder. With reference to FIGS. 1 and 2, in step S1 of FIG. 1 of the encoder section, we can see scene segmentation and depth layering in an object segmentation on this image in order to have the object definition on each segmented object. In step S2, the layered encoding action is performed on the segmented objects. At this point, the contour, motion, texture or coding information of each object is layered encoding as bitstreams through the multiplexer MUX, as shown in step S3, wherein the bitstreams include a background bitstream VOP1 and a broadcaster bitstream VOP2. In step S4, after the bitstream is transferred to the decoder, the demultiplexer DEMUX separately decodes the bitstreams VOP1 and VOP2. In step S5, the composition of the bitstreams VOP1 and VOP2 is performed to recover the original image.

In the technique view, MPEG-4 segments an image into different video objects to separately process the still and moving patterns in the image. The higher compression rate is used in the still background while the lower compression rate with respect to the still background is used in the moving foreground. In addition, when transferring the data, the background information is transferred only once; thereafter only the moving object information is transferred. Two kinds of information are composed on the client terminal. As such, the amount of data compressed and transferred can be greatly reduced.

However, the segmentation method above cannot solve the problems of still object segmentation and inconvenience.

SUMMARY OF THE INVENTION

An object of the invention is to provide a method of using MPEG-7 in an object segmentation, which uses both human vision model and the jigsaw principle to recognize and recover the object.

The invention provides a method of using MPEG-7 in an object segmentation, extracting the features of the object to build up a database, allowing the object to be recognized quickly from an image, regardless of whether the object is moving. The method includes the following steps. First, an object feature database is built up according to the MPEG-7 standardized definition. Second, watershed process is used to divide a video image frame into a plurality of objects when the video image frame exists. Third, each of the divided plurality of objects is compared to the object descriptor in the object feature database to find a target object. The most similar object including its shape and position in the video image frame is extracted as the target object based on the comparison result.

BRIEF DESCRIPTION OF THE DRAWINGS

The present invention can be more fully understood by reading the subsequent detailed description in conjunction with the examples and references made to the accompanying drawings, wherein:

FIG. 7b is a diagram of the result of FIG. 7a;

DETAILED DESCRIPTION OF THE PREFERRED EMBODIMENT

[MPEG-7 Introduction]

The standardized description of various types of multimedia information has been defined in MPEG-7 since 1996. MPEG-7 is formally called "Multimedia Content Description Interface". The Multimedia Content Description Interface focuses on the multimedia content, feature, or type to define the associated standard descriptors. The different searching engines with different functions can search all associated media material by indexing these standard descriptors. Non-digital audiovisual film or any document can be appended with these standard descriptors in order to be indexed fast and efficiently. The type of a descriptor must have the feature regardless of the media content mentioned above. In addition, when processing MPEG-4 media with hierarchical coding type, multilayer descriptors can also be used to support the multilayer index. For different applications, a descriptor must be given the respective definition so that the descriptor can be used in different applications. For example, a high-level feature description in a landscape contains the mountain and water elements while a low-level feature description is the color, texture, and shape, for example. The low-level features can generally be extracted automatically while the high-level feature is built by interactive dialog with a user. For the purpose of convenient search, these descriptors and the media data can be stored separately in a database.

Accordingly, the inventive object segmentation method derived from the MPEG-7 standards is applied to two following embodiments.

[First Embodiment]

Figure 1:
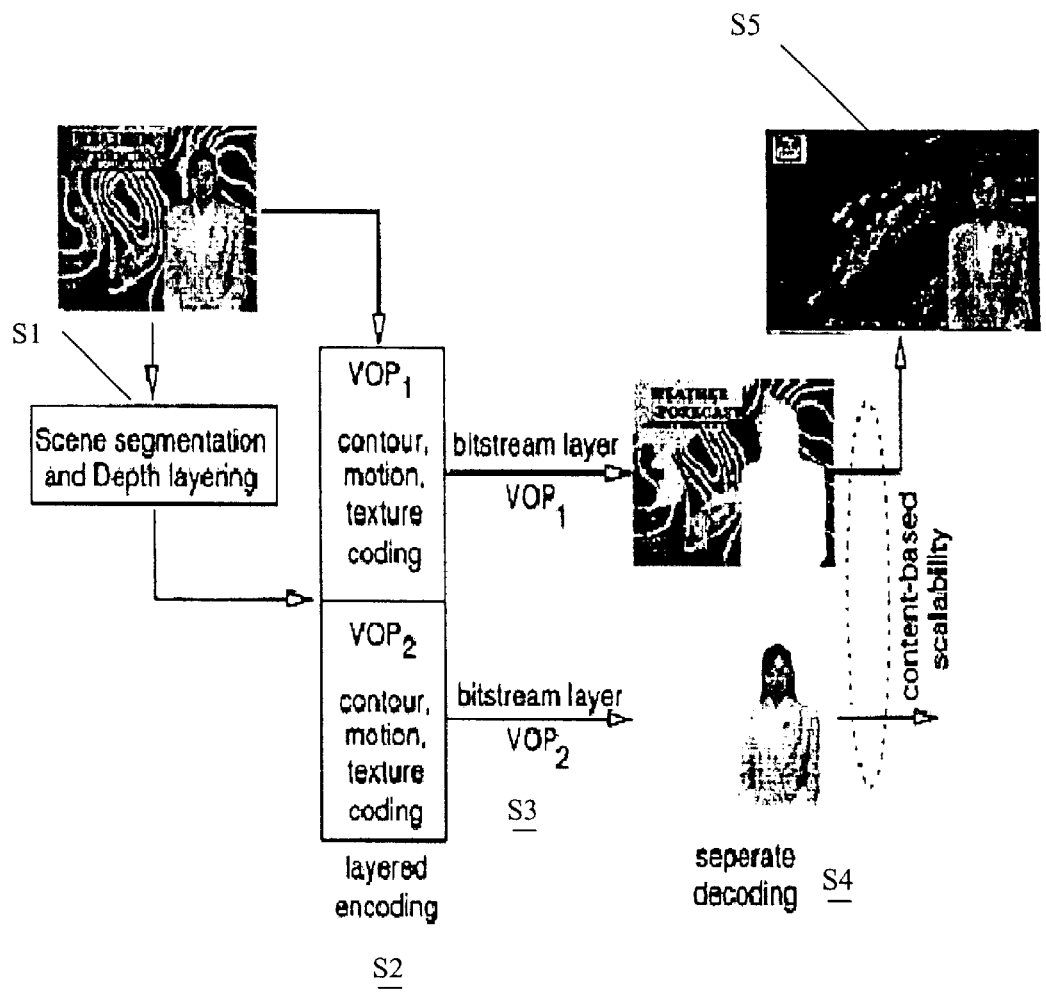
FIG. 1 is a schematic diagram of a typical VOP object-based configuration.
Figure 2:
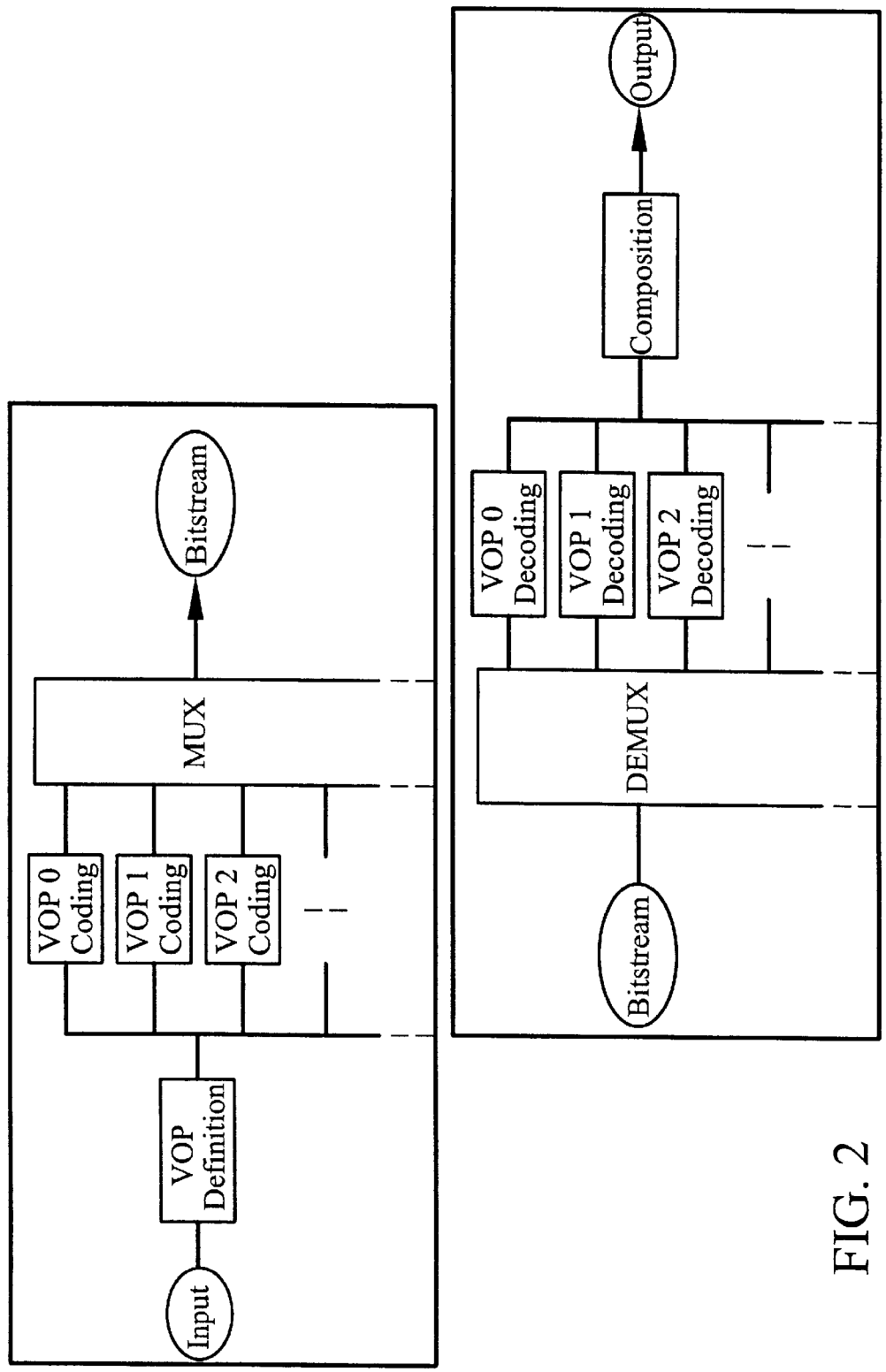
FIG. 2 is the structure of a VOP encoder and a VOP decoder.
Figure 3:
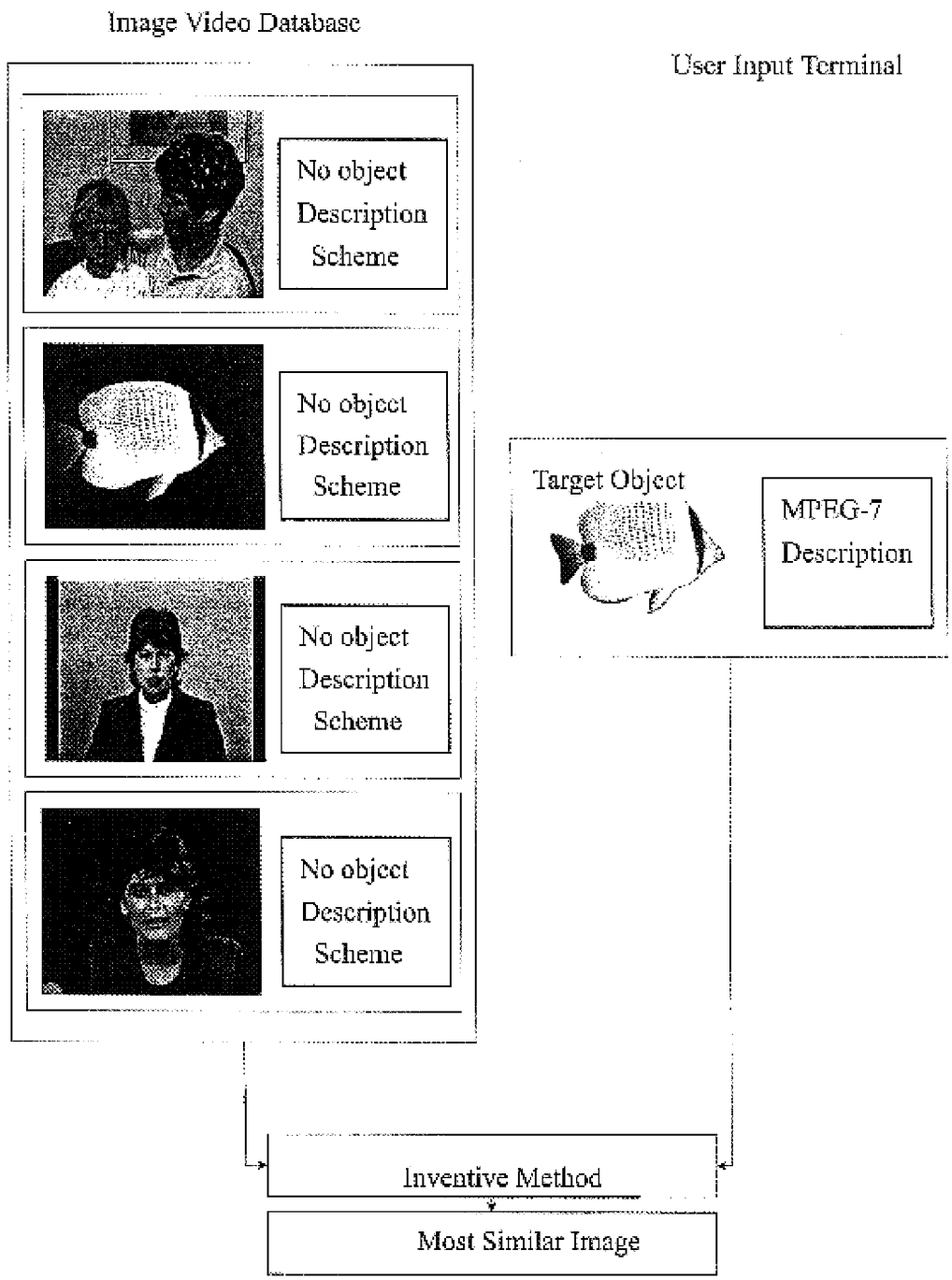
FIG. 3 is an embodiment of a content-based retrieval in accordance with the invention.

FIG. 3 shows an embodiment of a content-based retrieval in accordance with the invention. In FIG. 3, it is assumed that object descriptor of any image stored in a database does not existent. If a target object in an input image is presented, as shown in FIG. 3, the inventive method (described in detail later) and the input image descriptors are applied to search the database for the target object by segmenting each image in the database into multiple regions and comparing these regions with the target object. Therefore, the similar image to the target object is found by using this invention.

The embodiment does not directly use the content-based retrieval, for example, the indexes of the color, shape, and texture content. Rather, the feature descriptor is used to extract the target object in an image. Thus only one input image and data has the object descriptors.

[Second Embodiment]

Figure 4:
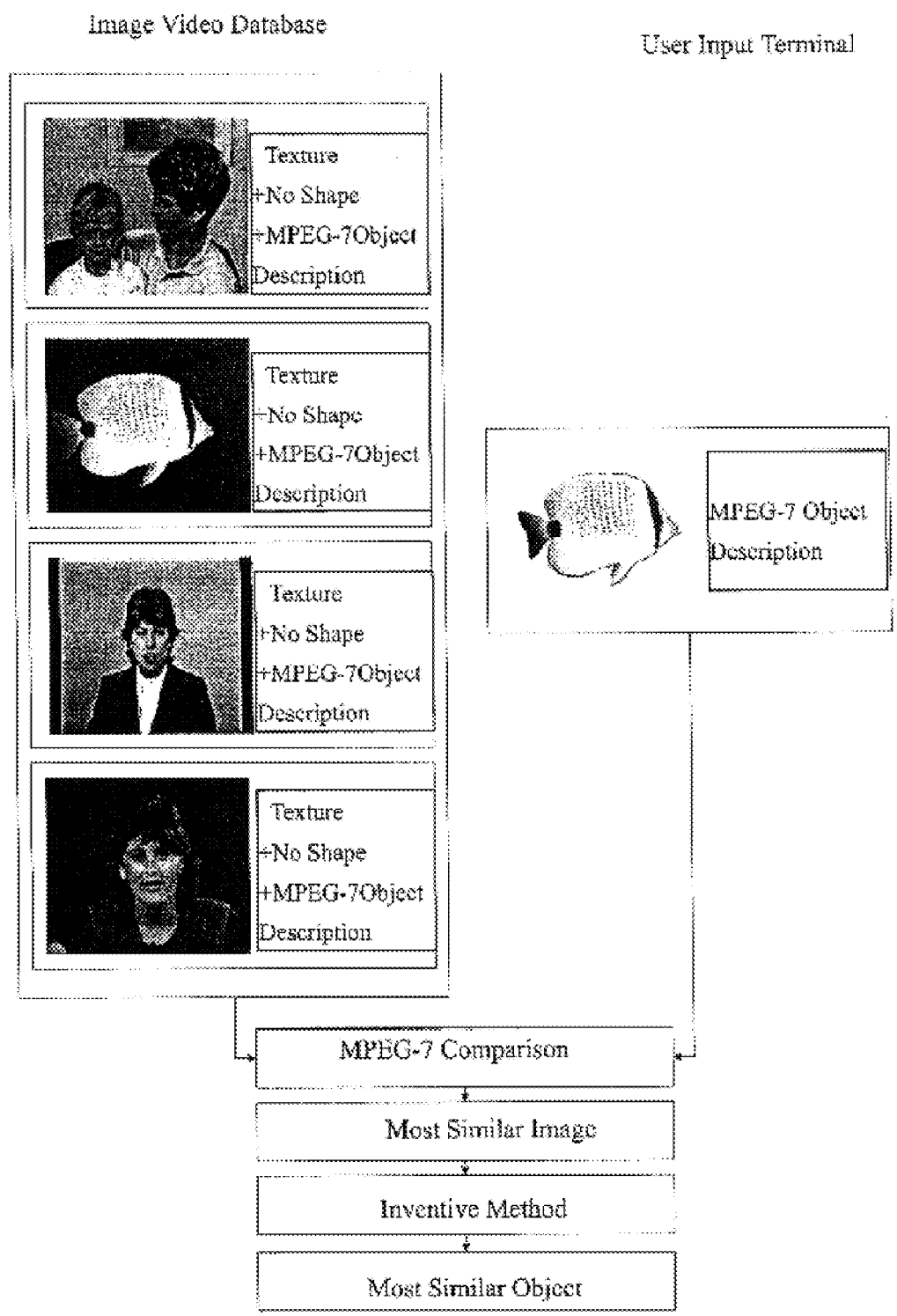
FIG. 4 is another embodiment of a content-based retrieval in accordance with the invention.

FIG. 4 shows another embodiment of a content-based retrieval in accordance with the invention. In FIG. 4, it is assumed that for the images stored in a database, no shape and position information of any object exists but only the object descriptors and the compression texture data in the frame-based are stored. At this point, when searching for an image stored in the database that includes the target object input by a user, this is accomplished by comparing the input image and each of the stored images according to the object descriptors and finding the desired image. The inventive method (described in detail later) and the object description features on the desired image are applied to extract the shape and position of the target object in the desired image.

[Entire Configuration of the Inventive Method]

Figure 5:
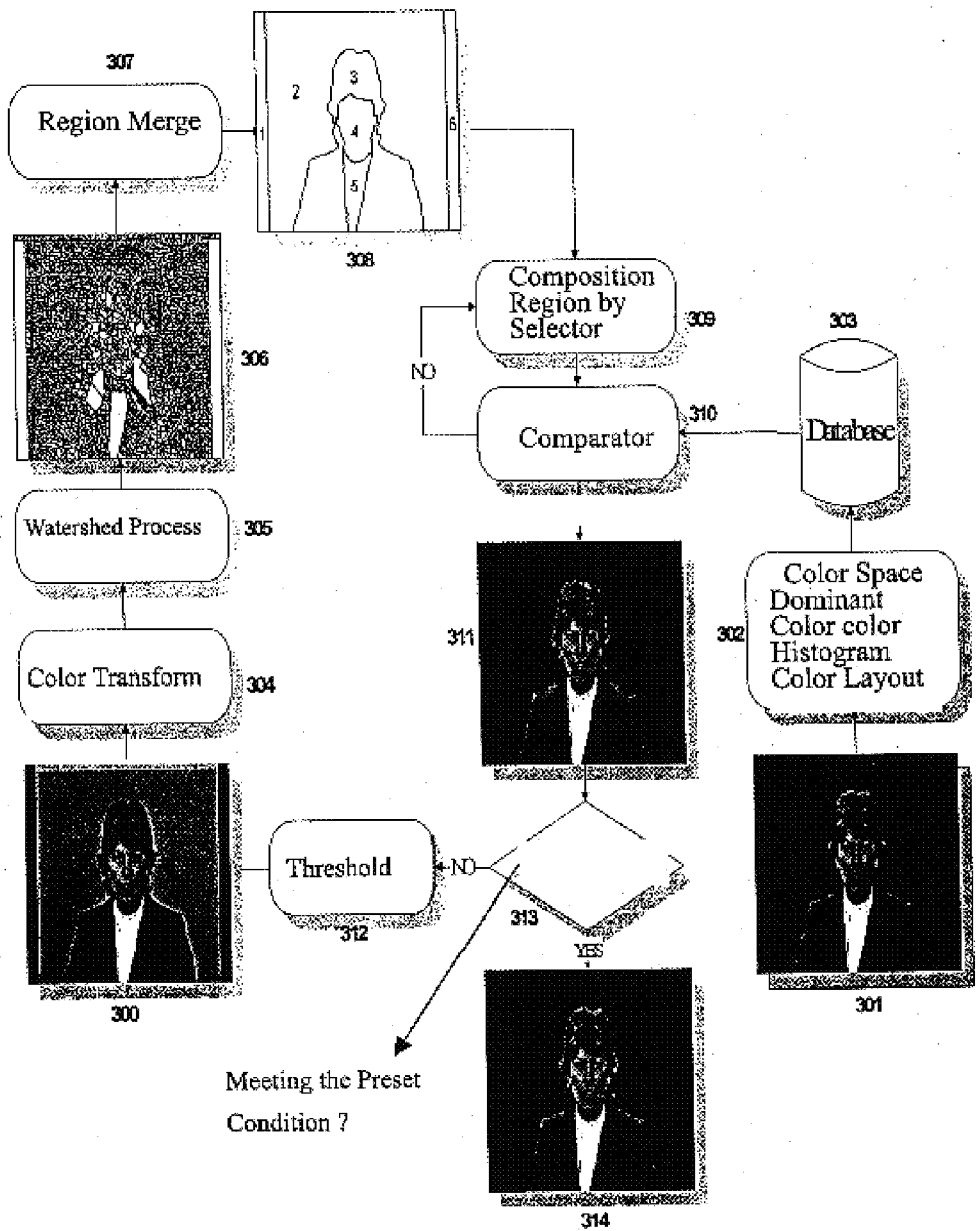
FIG. 5 is a flowchart of the invention.

FIG. 5 is a flowchart of the invention. A number of VOPs are drilled (301). The VOP features are extracted based on the MPEG-7 definition (302) and stored in an existing database (303). When a video signal is inputted (300), the color is transferred from a color image to a gray-scale image (304). The Watershed process divides the gray-scale image into multiple regions (306). To speed up the system process speed, a merge means is used (307) and a threshold value is set to control the merge conditions so that the number of required regions is reduced. The threshold is related to the color mean difference and gradient mean difference of the adjacent regions. A region selector combines all possible regions into a combined object according to a target object (309). Each of the combined objects is respectively compared to the data in the existing MPEG-7 database with a comparator (310). The one (VOP) having the most similarity with the comparison is output (311). If the output VOP is larger than defined by a user, the threshold value is reduced (312). At this point, the extracted object is more similar to the target object. This adjustment is performed until the threshold value is zero or the extracted object meets the user definition. The most similar VOP is output after the process (314).

[Step 303: Database Implemented by the MPEG-7 Technology]

The invention's use of current information processing techniques avoids manual operation of typical image management using the computer to classify and describe the abstract content. Therefore, typical problems such as no standards in manual operation and no capability for increasingly digital image data are effectively solved by the invention.

In general, descriptors used in a video image are object color, shape, motion (including the motion mode of a video camera and the motion of a scene), and others, briefly embodied in the following description.

(1) For color, four items are described:

A color space, such as RGB, YcrCb, and HSV, describes the color coordinate used in an image.

A dominant color describes a target object's main color by numeral and percent to provide the comparison parameters when searching.

A color histogram describes color statistical distribution useful in indexing similar images to the target object.

A color quantization describes the quantizated color level modes, e.g., linear, nonlinear, and lookup table.

Figure 6A:
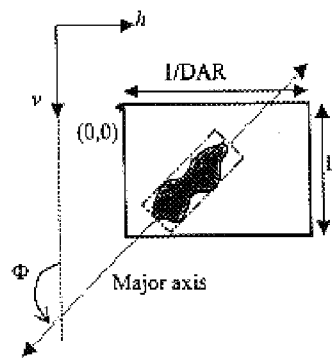
FIGS. 6a–6c are diagrams of three descriptors for describing the MPEG-7 object shape, which respectively are the object rectangular bounding box descriptor, the region-based shape descriptor, and the contour-based shape descriptor with zoom, rotation, twist and shadow.

(2) For object shape, three modes are described:

An object bounding box, as shown in FIG. 6a, describes an object's minimum rectangle aspect ratio, its relative position, and an included angle between the object's major axis and the coordinates.

Figure 6B:
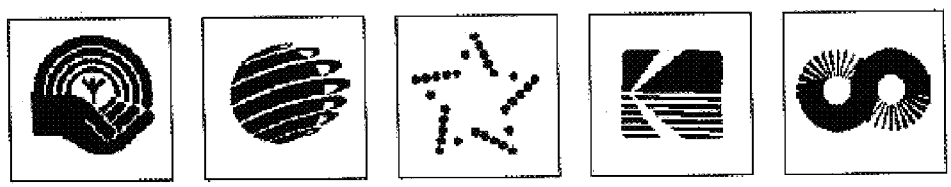

A region-based shape descriptor, as shown in FIG. 6b, describes an object's area used, in such a way to describe a more complicated object, e.g. a logo.

Figure 6C:
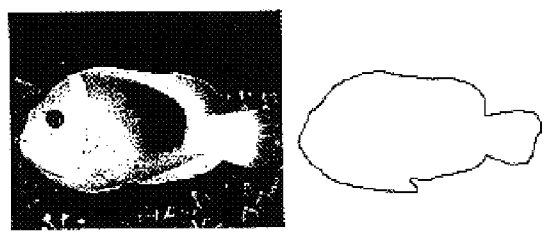
Figure 6C:
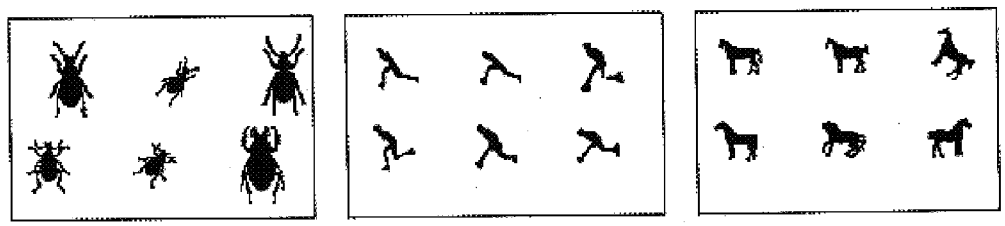

A contour-based shape descriptor, as shown in FIG. 6c, describes the actual shape and acts in zoom and twist by the curvature scale space.

(3) Motion descriptor, the possible motions are described in the following:

A camera motion describes all possible motions of a camera, for example, up, down, left, right, front, back, face-up, face-down, left-turn, right-turn, zoom in, zoom out, clockwise, counterclockwise, and still.

An object motion trajectory describes a moving object in a video, i.e., the spatial position record.

A parametric object motion describes the same as the object motion trajectory except that the motion trajectory is described by the parameters.

Accordingly, with the above descriptors, an appropriate description is given for a media object's content or type, which is referred to Description Scheme (DS).

[Step 304: Color Transformation]

To easily perform the watershed process, a color image is changed into a gray level image. The RGB mode converted multicolor to luminance before the watershed process (305). The color transformation is not limited in RGB mode, the following modes can also carry out the color transformation.

(1) YUV Color Coordinates

YUV color system is the standard used in NTSC, PAL, SECAM color televisions. Y is the luminance, and U and V are the chromatic signals. The relationship between the YUV and RGB modes is in the following equation set (1):

$$Y=0.299R+0.587G+0.114B$$

$$U=-0.147R-0.289G+0.436B$$

$$V=0.615R-0.515G+0.1B$$

(2) YIQ Color Coordinates

To meet the existing monochrome system, NTSC developed the YIQ color system. Chromatic signals I and Q are normally modulated respectively and added to the Y signal with sub-carrier modulation, wherein I and Q are derived from the chromatism signals (R-Y) and (B-Y), respectively. The relationship between the YIQ and RGB modes is in the following equation set (2):

$$Y=0.299R+0.587G+0.114B$$

$$I=0.596R-0.275G-0.321B$$

$$Q=0.212R-0.523G+0.311B$$

(3) YCbCr Color Coordinates

YcbCr is the color system used in the digital video standard developed by ITU-R BT. 601. The YCbCr color system can be applied in 525-line and 625-line systems. Most image compression standards, such as MPEG and H.263, use the YCbCr color system in the color space transformation and process. The relationship between the YCbCr and RGB modes is in the following equation set (3):

$$Y=0.299R+0.587G+0.114B$$

$$Cb=-0.169R-0.331G-0.5B$$

$$Cr=0.5R-0.419G-0.081B$$

[Step 305: Watershed Process]

Figure 7A:
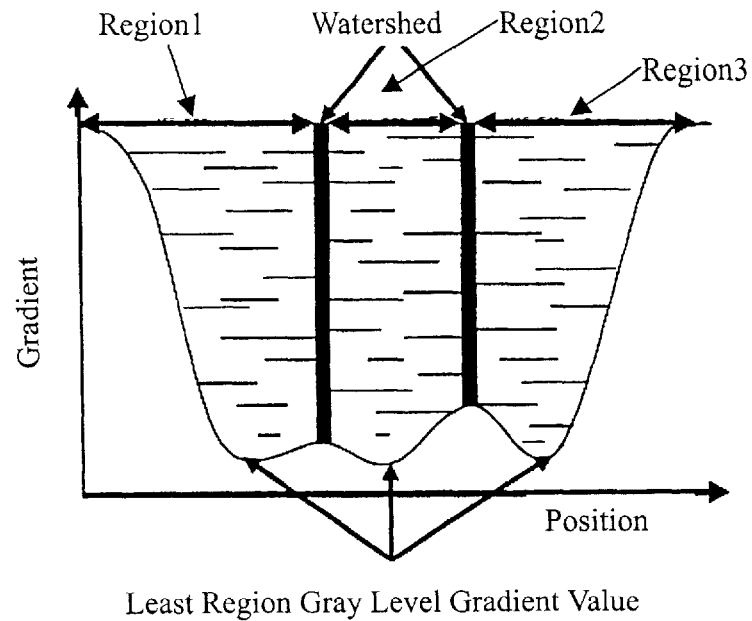
FIG. 7a is a schematic diagram of a watershed method applied in an object segmentation.

The watershed process uses the difference between the gray level values to relegate hard-to-classify pixels in an image to similar feature regions. This can be regarded as a region-extended algorithm. A schematic example is shown in FIG. 7a. The region with the lowest gray level gradient value is detected. A region expansion starts at this gradient value until the top of water adjacent to the basin boundary. When face to the basin boundary, a dam is added to separate the regions, thereby dividing an image into multiple regions. However, because the watershed process is over-sensitive to gray level gradient change, a merge action is used to complete the segmentation.

[Step 307: Speeding Up the Process by the Region Merge]

Figure 7B:
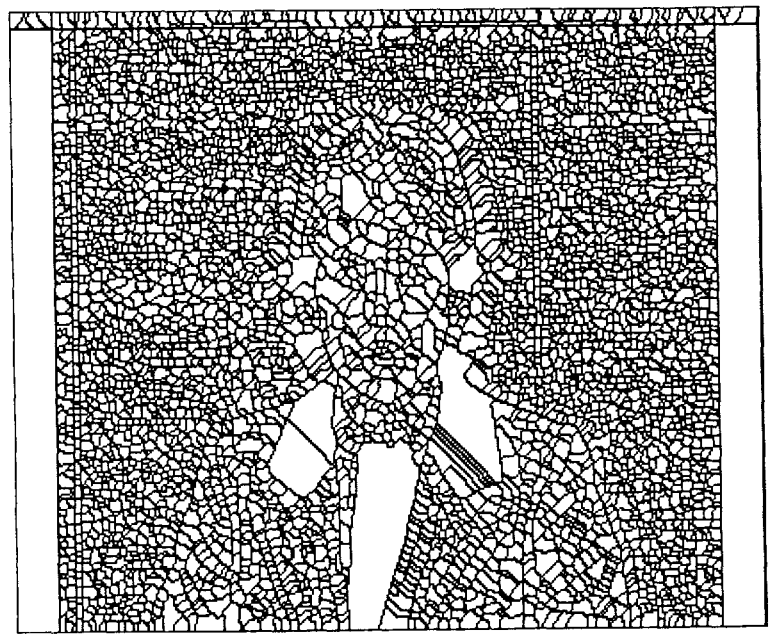
Figure 7C:
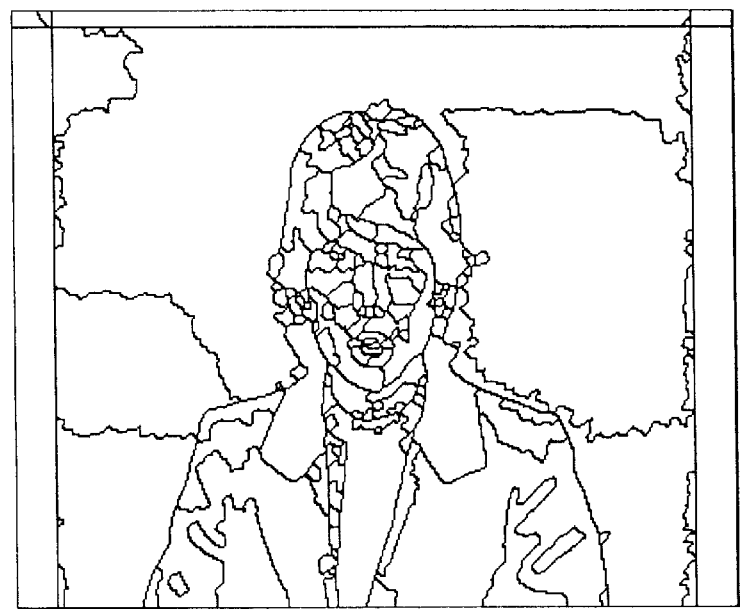
FIG. 7c is a diagram of the region merger result of FIG. 7b at a threshold value.

After the watershed process, many tiny regions exist, as shown in FIG. 7b. Therefore, a merge action is used to eliminate these divisions to form the result as shown in FIG. 7c. For example, a merge is performed when a gradient mean or expected value of the adjacent regions is smaller than the threshold value defined by the user. To speed up the process, the merge starts at the greatest threshold value. Once the result is out of the expected condition after processing a current threshold value, the current threshold value is reduced in order to repeat the merge action until the threshold value is zero or the result is the same as the expected condition. When the merge is complete, the most similar VOP is extracted to be the output.

[Step 309: Region Selection]

Figure 7D:
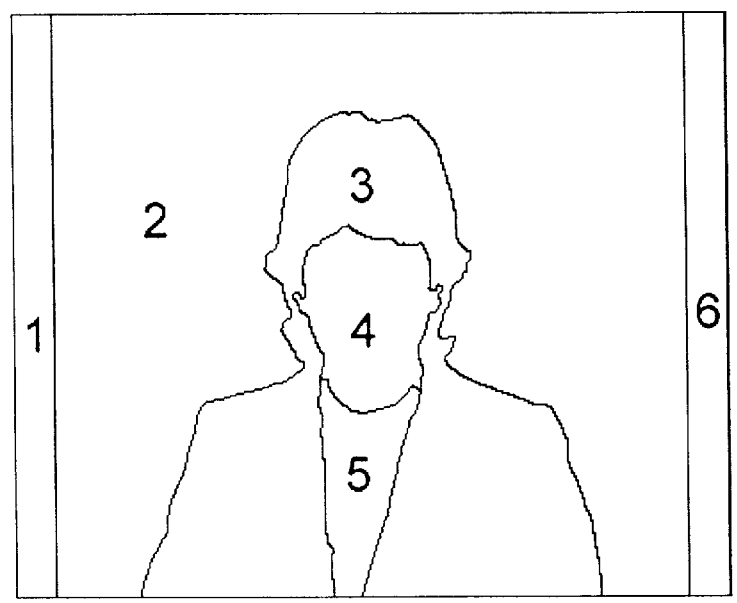
FIG. 7d is a diagram of the region merger result of FIG. 7b at another threshold value.

The image frame passing through the Watershed process and the region merge has different labels to indicate the resulting regions. For example, the numbers 1, 2, 3, 4, 5, and 6 are shown in FIG. 7d. With these labels, regions are merged under all possible compositions. For example, an image with regions labeled 1, 2, and 3 can have all compositions with (1), (2), (3), (1,2), (1,3), (2,3), and (1,2,3). For MPEG-7 descriptor comparison, the input image is compared with the original image at the same region position by the color information.

[Step 310: Comparison With the Comparator]

The respective similarity matching functions defined by MPEG-7 are applied to the region composition for comparison. The resulting differences are the base of comparison output. When the region compositions have been compared to the MPEG-7 descriptors, the region composition with the least total difference, with the most sets with the least comparison difference for the MPEG-7 descriptors, is output as the final segmentation result. The similarity matching functions are, for example, the color histogram defined by MPEG-7.

[Color Histogram]

Before the color histogram is applied, the features of the current data and the reference data are extracted by using the method described in the MPEG-7 specification. The comparator compares the extracted features, from the current and reference data, on the color histogram similarity using the similarity matching criteria. If needed, a weight can be used in the comparison. For example, the extracted feature under the HSV color coordinates can be represented by the following equation set (4):

$$w_{i,j} = 1 - \sqrt{\frac{(v(i)-v(j))^2 + (s(i)\cdot\cosh(i) - s(j)\cdot\cosh(j))^2 + (s(i)\cdot\sinh(i) - s(j)\cdot\sinh(j))^2}{2}} \quad (4)$$

$$W = [w_{i,j}]; \ 0 \le i < \text{number\_of\_cells}; \ 0 \le j < \text{number\_of\_cells}$$

Assume that hist [A] is the current data's color histogram set and hist [B] is the reference's color histogram set. Accordingly, the following equation (50, which is derived from the equation set (4), can represent the color histogram similarity of the current and reference.

$$dist(A,B)=[hist(A)-hist(B)]^T W[hist(A)-hist(B)] \quad (5)$$

For equation (5), the more similar the current data and the reference data, the smaller the distance value on equation (5).

For the comparator, the descriptors used in a variety of video images have the respective set of similarity matching criteria, which includes computing the difference between the current and reference data and selecting the most similar one as the output VOP (image) as shown in 314 of FIG. 5. In addition, input image 300 is the original and database image 301 is pre-extracted the VOP features by the MPEG-7 descriptors (302) and stored in the database (303).

Finding a similar VOP in a search is relatively easy, and thus the invention is well suited for the video object segmentation process.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of using MPEG-7 in the object segmentation, comprising the steps of:

extracting the feature of an existing video object Plane (VOP) by the MPEG-7 technique, storing it in an MPEG-7 database and presetting a value;

segmenting an input video image into a plurality of regions by color transformation and the Watershed process;

setting the merge adjustment condition using a merge means and a threshold value to minimize the number of regions segmented;

finding all possible region combinations using a region selector;

finding the highest similarity region combination using a comparator to compare the VOP features stored in the MPEG-7 database to all possible region combinations found by the region selector and outputting the highest similarity region combination as a target VOP, wherein, the threshold value is reduced to increase the number of regions segmented if the target VOP is greater than the preset value and the threshold value is increased to reduce the number of regions segmented if the target VOP is smaller than the preset value, so that the highest similarity region combination output is more similar to the VOP in the input video image;

repeating the acquisition of highest similarity region combination step until the adjusted threshold value meets any of the preset values and the value zero; and outputting the highest similarity region combination, after the threshold value adjustment is completed, as the final target VOP.

2. The method as claimed in claim 1, further comprising a MPEG-7 presetting database step, which is implemented by the MPEG-7 descriptors defined in the specification recommendation.

3. The method as claimed in claim 2, wherein the MPEG-7 descriptors comprise the VOP's color, shape, and motion.

4. The method as claimed in claim 3, wherein the color comprises color space, dominant color, color histogram and color layout.

5. The method as claimed in claim 3, wherein the shape comprises object bounding box, region-based shape descriptor and contour-based shape descriptor.

6. The method as claimed in claim 3, wherein the motion comprises camera motion, object motion trajectory and parametric object motion.

7. The method as claimed in claim 1, wherein the color transformation technique uses RGB mode to convert the image into a monochrome.

8. The method as claimed in claim 7, wherein the monochrome is gray level.

9. The method as claimed in claim 1, wherein the watershed process comprises: detecting the region with the smallest gray level as a start of the region expanding to the water top adjacent to a basin, where a separate dam is added to isolate the region from the water of other regions.

10. The method as claimed in claim 1, wherein the region merger is performed by the merge means when the mean difference of the gray level between the regions is smaller than the preset value.

11. The method as claimed in claim 1, wherein the region merger is performed by the merge means when the expected value difference of the gray level between the regions is smaller than the preset value.

12. The method as claimed in claim 1, wherein the using the comparator comprises: defining a respective similarity matching criteria for each descriptor using the MPEG-7 technique; comparing the image combined by the merge means to the comparison equation representing the feature of the existing VOP stored in the database; and outputting the VOP having the most sets with the least comparison difference from the similarity matching criteria for the MPEG-7 descriptors.

13. The method as claimed in claim 12, wherein the comparison equation uses the MPEG-7 descriptor similarity matching criteria equations comprising the following color histogram comparison equation:

$$dist(A,B)=[hist(A)-hist(B)]^T W[hist(A)-hist(B)]$$

where hist [A] is the VOP's color histogram set of the input image, hist [B] the existing VOP's color histogram set and W the weight.

14. The method as claimed in claim 13, wherein the weight W depends on the color transformation used.

15. The method as claimed in claim 14, wherein the color transformation mode comprises HSV mode, RGB mode, and YcbCr mode.

* * * * *